United States Patent
Baun et al.

(10) Patent No.: US 7,482,564 B2
(45) Date of Patent: Jan. 27, 2009

(54) HIGH DEFINITION TELESCOPE

(75) Inventors: Kenneth W. Baun, Trabuco Canyon, CA (US); John E. Hoot, San Clemente, CA (US)

(73) Assignee: Meade Instruments Corporation, Irvine, CA (US)

( * ) Notice: Subject to any disclaimer, the term of this patent is extended or adjusted under 35 U.S.C. 154(b) by 454 days.

(21) Appl. No.: 11/110,484

(22) Filed: Apr. 20, 2005

(65) Prior Publication Data

US 2006/0238861 A1   Oct. 26, 2006

(51) Int. Cl.
G01C 21/02 (2006.01)
H01L 27/00 (2006.01)
G02B 23/00 (2006.01)
G01B 11/26 (2006.01)

(52) U.S. Cl. ................. 250/203.1; 250/208.1; 359/399; 359/430; 356/139.01

(58) Field of Classification Search .............. 250/208.1, 250/203.4, 203.6, 203.1, 201.2, 201.4, 203.5; 359/363, 399, 400, 401, 430; 356/139.01, 356/139.03, 139.04, 147

See application file for complete search history.

(56) References Cited

U.S. PATENT DOCUMENTS

| | | | |
|---|---|---|---|
| D268,786 S | 4/1983 | Galindo | |
| 4,682,091 A | 7/1987 | Krewalk et al. | |
| 4,944,587 A | 7/1990 | Harigae et al. | |
| 5,223,702 A | 6/1993 | Conley | |
| 5,311,203 A | 5/1994 | Norton | |
| 5,335,190 A | 8/1994 | Nagle et al. | |
| 5,525,793 A | 6/1996 | Holmes et al. | |
| D390,583 S | 2/1998 | Diebel et al. | |
| D392,657 S | 3/1998 | Diebel et al. | |
| 5,745,869 A | 4/1998 | Van Bezooijen | |
| D412,920 S | 8/1999 | Diebel et al. | |
| 5,935,195 A | 8/1999 | Quine | |
| D417,680 S | 12/1999 | Diebel et al. | |
| D417,881 S | 12/1999 | Diebel et al. | |
| D422,610 S | 4/2000 | Diebel et al. | |
| 6,056,554 A | 5/2000 | Samole et al. | |
| 6,304,376 B1 | 10/2001 | Braun et al. | |
| 6,366,212 B1 | 4/2002 | Lemp | |
| 6,369,942 B1 | 4/2002 | Hedrick et al. | |
| 6,392,799 B1 | 5/2002 | Braun et al. | |
| 6,445,498 B1 | 9/2002 | Braun et al. | |
| 6,563,636 B1 | 5/2003 | Braun et al. | |
| 6,603,602 B1 | 8/2003 | McWilliams | |
| 6,671,091 B2 | 12/2003 | McWilliams | |

(Continued)

OTHER PUBLICATIONS

Copending U.S. Appl. No. 10/864,134, filed Jun. 9, 2004.

(Continued)

Primary Examiner—Georgia Y Epps
Assistant Examiner—Don Williams
(74) Attorney, Agent, or Firm—Knobbe, Martens, Olson & Bear LLP

(57) ABSTRACT

Embodiments of the present disclosure include presenting data related to image information captured by a telescope on an electronic display, such as, for example, a high definition display. For example, a telescope control system may advantageously output video or other signals to one or more displays in a multi-media or image presentation. In certain preferred embodiments, such display comprises high definition displays, or the like. For example, such display may comprise entertainment, academic or other presentations.

20 Claims, 9 Drawing Sheets

U.S. PATENT DOCUMENTS

| | | |
|---|---|---|
| D492,334 S | 6/2004 | Hines et al. |
| D496,672 S | 9/2004 | Hines et al. |
| D496,673 S | 9/2004 | Hines et al. |
| D502,201 S | 2/2005 | Hines et al. |
| D502,481 S | 3/2005 | Hines et al. |
| 6,922,283 B2 | 7/2005 | Baun et al. |
| 6,972,902 B1 | 12/2005 | Chen et al. |
| 7,046,438 B2 | 5/2006 | McWilliams |
| 7,068,180 B2 | 6/2006 | Lemp |
| 7,079,317 B2 | 7/2006 | Baun et al. |
| 7,092,156 B2 | 8/2006 | Baun et al. |
| 7,221,527 B2 | 5/2007 | Baun et al. |
| 7,339,731 B2 | 3/2008 | Baun et al. |
| 2002/0171924 A1* | 11/2002 | Varner et al. ............ 359/363 |
| 2003/0156324 A1 | 8/2003 | Braun et al. |
| 2003/0197930 A1 | 10/2003 | Braun et al. |
| 2004/0047036 A1 | 3/2004 | Braun et al. |
| 2004/0090673 A1 | 5/2004 | McWilliams |
| 2004/0233521 A1 | 11/2004 | McWilliams |
| 2005/0046581 A1 | 3/2005 | Lemp et al. |
| 2005/0057801 A1 | 3/2005 | McWilliams |
| 2005/0225854 A1 | 10/2005 | McWilliams |
| 2005/0246911 A1 | 11/2005 | Acres |
| 2006/0092508 A1 | 5/2006 | Baun et al. |
| 2006/0103926 A1 | 5/2006 | Meyers et al. |
| 2006/0158722 A1 | 7/2006 | Fujimoto et al. |
| 2007/0217000 A1 | 9/2007 | Baun et al. |
| 2007/0283583 A1 | 12/2007 | Subbiondo et al. |
| 2008/0018995 A1 | 1/2008 | Baun |

OTHER PUBLICATIONS

Pending claims from copending U.S. Appl. No. 09/771,385, filed Jan. 26, 2001, U.S. Publication No. 2004/0233521.

W.M. Smart, Textbook on Spherical Astronomy, sixth edition, Cambridge University Press, 1977.

http://www.starvisiontech.com/news/starIDlicense.asp, StarVision Secures Exclusive License to Star Identification Software, May 23, 2005, 1 page downloaded and printed from the World Wide Web on or about Oct. 25, 2006.

International Search Report and Written Opinion for International Application No. PCT/US2006/015530, mailing date Aug. 17, 2006.

* cited by examiner

HIGH DEFINITION TELESCOPE

REFERENCE TO RELATED APPLICATIONS

The present disclosure relates to U.S. patent application Ser. No. 11/110,626, filed herewith, titled "Self-Aligning Telescope," incorporated by reference herein.

BACKGROUND

1. Field of the Disclosure

The present disclosure relates to telescope control systems and, more particularly, to systems and methods for aligning and orienting telescopes.

2. Description of the Related Art

The continuing evolution of low cost, high performance telescopes has decreased the complexity of finding and tracking stars, planets and other celestial objects. Thus, the popularity of amateur astronomy has increased. Some conventional telescope systems are easy to use and are capable of finding and tracking stars and other celestial bodies once they are initially oriented with the celestial sphere. However, the initial orientation is generally manual and conventional routines that align a telescope with a desired celestial object generally include user intervention, such as manually centering the telescope on an alignment star.

Often, to view or otherwise image celestial objects, measurements obtained in a telescope's coordinate system (expressed, for example, in altitude and azimuth coordinates) are converted into the celestial coordinate system (expressed, for example, in right ascension and declination coordinates) and vice versa. Such conversions depend at least in part on the initial orientation of the telescope. For example, the initial orientation of the telescope may be set by manually pointing the telescope in a predetermined direction, such as north or south, and leveling the telescope such that it points toward the horizon. When a telescope processing system knows the current date, the current time, the location of the telescope with respect to the earth, the right ascension of a desired celestial object, and the declination of the desired celestial object, the processing system can convert the location of the desired celestial object from the celestial coordinate system to the telescope's coordinate system to indicate a change in altitude and azimuth that will point the telescope away from its current orientation toward the desired celestial object. Such orientation and alignment of the telescope can be complicated to a less experienced user.

To attempt to remedy difficulties experienced in aligning a telescope, manufacturers have suggested aligning telescopes with the celestial sphere by randomly scanning the sky in search of bright stars. For example, when a telescope finds a first bright star, recognized through for example, user interaction, the telescope monitors changes in altitude and azimuth as it scans for additional bright stars. Upon receiving an indication of alignment with an additional bright star, the telescope compares its respective altitude and azimuth measurement changes to determine an angle between the now located two bright stars. After the telescope has recorded multiple angles between randomly found bright stars, the collection of determined angles may produce shapes that the telescope may recognize from, for example, data of known shapes between known bright stars. Once the shape is recognized, manufacturers believe the telescope will have sufficient information to align itself with the sky. However, because of many difficulties, including random searching with limited fields of view and potentially large comparison data sizes, such shape-oriented alignment systems may be extraordinarily slow and potentially inaccurate.

SUMMARY OF THE INVENTION

Embodiments of the present disclosure include advantageous self-aligning telescope control systems that quickly and accurately orient a telescope. For example, in an embodiment, a telescope control system acquires at least one image of stars in an alignment area, attributes intensity values to some of the stars, determines relationships based on the intensity values, and matches the relationships with known relationships about celestial bodies to quickly orient the telescope with known celestial mappings of the sky. Once oriented, the telescope control system can then slew to a desired celestial object based on, for example, user or system selected objects. In an embodiment, the telescope control system may slew to additional alignment areas, and quickly reorient the telescope to increase the accuracy of the telescope's self alignment.

Certain embodiments provide self-aligning telescope control systems with additional information such as, for example, time, date, location with respect to the earth, celestial coordinates of an alignment star or alignment area, relative brightness of a group of stars in an alignment area, distances between the stars in the group of stars in the alignment area, patterns formed by stars in vicinity of the alignment star, combinations of the foregoing, or the like. In certain embodiments, determining a telescope's location with respect to earth may include use of a virtual location, thereby substantially avoiding often confusing initial precision leveling techniques. For example, a telescope control system may orient with respect to the horizon and/or a predetermined compass direction in response to receiving information from a level sensor, an electronic compass, or the like. Such self orientation creates a virtual location for the telescope, where the virtual location at least roughly corresponds to a location where the telescope's position with respect to the horizon would be considered accurately leveled.

In still other embodiments, the control system may advantageously perform additional or alternative alignments, such as, for example, measuring a sidereal drift of an alignment star to improve the accuracy of the mapping.

Once aligned, other embodiments of the telescope control system may advantageously slew the telescope to view any desired celestial object, such as an object especially interesting for the particular imaging time and imaging location. For example, an imager of the telescope control system may acquire potentially high quality celestial images or data. Moreover, the telescope control system may process the image data to advantageously increase the aesthetics of a displayed image, highlight various comparative data, increase the image's accuracy, sharpness, detail, contrast, or the like. Once prepared, the telescope control system outputs video or other signals to one or more displays in a multimedia or other image presentation, such as an entertainment, commercial, academic, or other presentation. In certain preferred embodiments, such display comprises high definition displays, or the like.

Also, other features and advantages of the present disclosure will become apparent to those of ordinary skill in the art through consideration of the ensuing description, the accompanying drawings, and the appended claims. Neither this summary nor the following detailed description defines the scope of the disclosure.

BRIEF DESCRIPTION OF THE DRAWINGS

Systems and methods which embody the various features of the disclosure will now be described with reference to the following drawings.

DETAILED DESCRIPTION OF PREFERRED EMBODIMENTS

Figure 1:
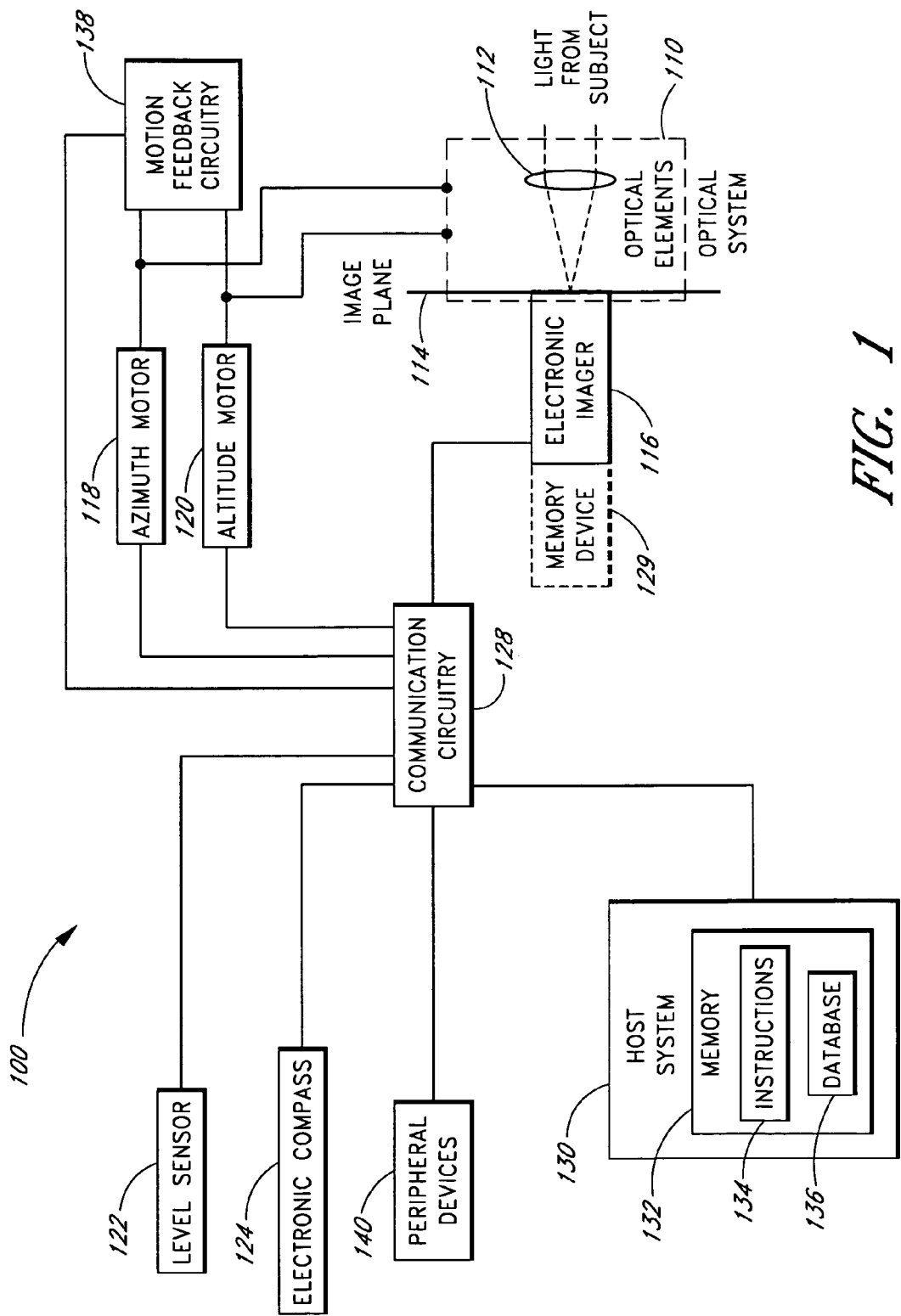
FIG. 1 is a block diagram illustrating a telescope control system according to an embodiment of the disclosure.

Embodiments of the present disclosure involve a telescope control system that orients a telescope with respect to the celestial sphere. To orient the telescope, certain embodiments of the telescope control system point the telescope in the direction of an alignment star or alignment area of the sky. The telescope control system images a field of view in the alignment area, and processes the images to determine the celestial coordinates of a point such as a center of the field of view the alignment area. The telescope control system then maps the telescope's coordinate system to the celestial coordinate system. Once mapped, the telescope control system can advantageously slew the telescope to any desired celestial object in the viewable sky based on, for example, user selection, system recommendations, combinations of the same, or the like.

In certain embodiments, the telescope control system seeks to improve the accuracy of the foregoing self alignment procedure. For example, the telescope control system may advantageously slew to an additional alignment area and realign, may advantageously measure the drift of one or more alignment stars or the desired celestial object, combinations of the same, or the like.

In certain embodiments, the telescope control system may also advantageously determine a first orientation of the telescope with respect to the earth. For example, the system may determine the telescope's position with respect to the horizon and its pointing position. For example, if the telescope is located in the northern hemisphere, its orientation with respect to a level plane and magnetic north may be approximately determined. Given the date, time and location of the telescope with respect to the earth, the telescope control system can move the telescope from its initial orientation toward a celestial object having known celestial coordinates, such as an alignment star, group of alignment stars, alignment area, or the like. In certain embodiments, a user provides the date, time and location information. In other embodiments, a host system or peripheral device may advantageously provide at least one of the date information, the time information and the location information.

Once aligned, the telescope control system may advantageously slew the telescope to view any desired celestial object. Moreover, the telescope control system may advantageously suggest interesting or otherwise desired objects based on the time, date, and location of the telescope. The control system may also configure or suggest configurations for its own processing, for the telescope, for telescope accessories such as magnification devices, optical filters, or the like, for environmental concerns, or the like. The telescope control system may also employ an imager to develop potentially high quality celestial images or data. Such images or data may be compiled from one or more pictures, may be resized, recolored, or the like, may be the result of a mosaic of pictures, may be processed data such as spectral or other views, may be combined image data such as a mosaic-ed image of Jupiter with added images of one or more of its moons in actual or altered colors, combinations of the same, or the like. Such data and image processing may advantageously increase the aesthetics of the displayed image, may highlight various comparative data, may increase the image's accuracy, sharpness, detail, contrast, or the like. Once prepared, the telescope control system may advantageously output video or other signals to one or more displays in a multimedia or image presentation. In certain preferred embodiments, such display comprises high definition displays, or the like. For example, such display may comprise entertainment, academic or other presentations that may be self selected based on programs like "Tonight's Best" commercially available from Meade Instruments Corporation of Irvine, Calif., may be selected through user interaction, combinations of the same, or the like.

The telescope control system may also be located in a first area or device, the telescope may be located in the same or other area or device, and the presentation may be located in one of the disclosed areas or devices or in additional other areas or devices. For example, the telescope control system may be comprised of computer software executing on a computing device such as a laptop, and controlling electronic controls of a remotely located telescope, such as, for example, a personal, academic, or governmental telescope. The image data may be displayed on the computing device, or displayed on remote display devices such as, for example, high definition display devices located in a personal, entertainment, academic, or other viewing setting.

To facilitate an understanding of the disclosure, the remainder of the detailed description references the drawings, wherein like reference numbers are referenced with like numerals throughout. Moreover, the drawings show, by way of illustration, specific embodiments or processes in which the disclosure may be practiced. The present disclosure, however, may be practiced without the specific details or advantages or with certain alternative equivalent components and methods to those described herein. In other instances, well-known components and methods have not been described in detail so as not to unnecessarily obscure aspects of the present disclosure.

FIG. 1 is a block diagram illustrating a telescope system 100 according to an embodiment of the disclosure. The telescope system 100 includes an optical system 110 configured to collect light from a subject through optical elements 112 and to focus the light at an image plane 114. The telescope system 100 also includes an electronic imager 116, an azimuth motor 118, an altitude motor 120, a level sensor 122 and an electronic compass 124 coupled to communication circuitry 128. In an exemplary embodiment, the level sensor 122 comprises an accelerometer such as a dual axis accelerometer, part number MXD2020E/F, available from MEMSIC, Inc. of North Andover, Mass. In addition, or in another exemplary embodiment, the electronic compass 124 comprises, for example, a magneto-inductive sensor, part number SEN-L, available from Precision Navigation, Inc. of Santa Rosa, Calif., although an artisan will recognize from the disclosure herein other level sensing devices could be used.

The electronic imager 116 is configured to generate an electronic image of the light from the subject. Thus, the electronic imager 116 is positioned with respect to the image plane 114 so as to receive a focused optical image of the subject. In certain embodiments, the electronic imager 116 comprises, for example, a charge coupled device (CCD) camera, a complimentary metal oxide semiconductor (CMOS) image array, or the like. In certain embodiments, the electronic imager 116 includes a memory device 129 for storing images generated by the electronic imaging device 116. The memory device 129 may comprise, for example, a removable or non-removable flash memory device, a miniature hard-drive, or another memory device associated with digital cameras, digital camcorders, cell phones, personal digital assistants (PDAs), other computing devices, or the like.

In addition to or as an alternative to storing images in the memory device 129 of the electronic imager 116, the communication circuitry 128 transmits data from the electronic imager 116 to a telescope control or host system 130. The host system 130 is configured to receive image data, provide control signals to the azimuth and altitude motors 118, 120, analyze the data, and optionally, to display images generated by the electronic imager 116. The analysis may include, for example, identifying an alignment star or group of alignment stars and calculating how far to rotate the azimuth motor 118 and the altitude motor 120 to align the optical system 110, as described herein. The host system 130 may be configured to interface with input devices (not shown) such as an Internet or other network connection, a mouse, a keypad or any device that allows an operator to enter data. The host system 130 may also include output devices such as printers, displays or other devices or systems for generating hard or soft copies of images or other data. In certain embodiments, the host system 130 is configured to interface with a television, such as a high-definition television, to display images from the electronic imager 116 thereon.

In an exemplary embodiment, the host system 130 comprises a handheld device. In other embodiments, the host system 130 may comprise, for example, a computer system, a personal computer, a laptop computer, a set top box for a television, a personal digital assistant (PDA), a network, combinations of the same, or the like. The communication circuitry 128 may, for example, transmit the data to the host system 130 wirelessly, through a direct electrical connection, or through a network connection. In certain embodiments, the communication circuitry 128 comprises a universal serial bus (USB) adapter. In other embodiments, the communication circuitry 128 comprises a wireless Ethernet adapter or other network adapter.

In certain other embodiments, the host system 130 comprises a controller housed with the optical system 110 and/or the electronic imager 116. For example, the host system 130 may comprise one or more controllers, program logic, hardware, software, or other substrate configurations capable of representing data and instructions which operate as described herein or similar thereto. The host system 130 may also comprise controller circuitry, processor circuitry, digital signal processors, general purpose single-chip or multi-chip microprocessors, combinations of the foregoing, or the like. In such embodiments, the communication circuitry 128 comprises a system bus or other electrical connections.

As shown in FIG. 1, in certain embodiments, the host system 130 includes an internal memory device 132 comprising, for example, random access memory (RAM). The host system 130 can also be coupled to an external memory device (not shown) comprising, for example, drives that accept hard and floppy disks, tape cassettes, CD-ROM or DVD-ROM. The internal memory device 132 or the external memory device, or both, comprise program instructions 134 for aligning the optical system 110, composing images of the subject and other functions as described herein.

In certain embodiments, the internal memory device 132 or the external memory device, or both, also comprise one or more databases 136 including at least one database of the celestial coordinates (expressed, for example, in right ascension and declination or other well known coordinate systems) of known celestial objects that might be of interest to an observer and/or that are useful to align the optical system 110. For example, the database 136 may include celestial coordinates and intensities of an alignment star or a group of alignment stars. The database 136 may also define a pattern made by at least one group of alignment stars. For example, the database 136 may include relationship information for the group of alignment stars such as brightness relative to one another, angular distances to one another, angles between each other, combinations of the foregoing, or the like. Other exemplary relationships between celestial objects are discussed herein. As discussed below, in certain embodiments, the host system 130 is configured to automatically recognize a pattern of alignment stars and center the optical elements 112 on a desired celestial object selected from the database 136. In certain embodiments, the host system 130 also uses information from the database 136 to drive a focus motor (not shown) to automatically focus the optical system 110 on the desired celestial object.

The database 136 may also include, for example, a database of the geographical coordinates (latitude and longitude) of a large number of geographical landmarks. These landmarks might include known coordinates of cities and towns, geographic features such as mountains, and might also include the coordinates of any definable point on the earth's surface whose position is stable and geographically determinable. Thus, a user can estimate the position of the optical system 110 with respect to the earth by referencing a nearby geographical landmark in the database. As discussed below, in other embodiments, location information is provided automatically from a global positioning system (GPS) receiver. In certain embodiments, the database 136 is user accessible such that additional entries of particular interest to a user might be included.

As discussed in detail below, the host system 130 controls the azimuth motor 118 and the altitude motor 120 to align the optical elements 112 with the light from the subject. The azimuth motor 118 and the altitude motor 120 are configured to rotate the optical system 110 in two mutually orthogonal planes (e.g., azimuth and altitude). In certain embodiments, the azimuth motor 118 and the altitude motor 120 are each self-contained motor packages including, for example, a DC brush-type motor, an associated electronics package on a printed circuit board, and a drive and reduction gear assembly. An artisan will recognize from the disclosure herein that other known motor and/or servo systems can also be used. In certain embodiments, the azimuth motor 118 and the altitude motor 120 are coupled to motion feedback circuitry 138, such as an optical encoder or the like. The motion feedback circuitry 138 measures the actual travel of the optical system 110 in both planes. Thus, the position of each axis (and the telescope aspect) is determinable with respect to an initial position.

In certain embodiments, the host system 130 automatically determines an orientation of the optical elements 112 using data received through the communication circuitry 128 from the level sensor 122 and the electronic compass 124. During an initial alignment, the host system 130 determines the orientation of the optical elements 112 with respect to the horizon based on one or more signals received from the level sensor 122. This becomes the initial altitude position. The host system also determines the orientation of the optical elements 112 with respect to north (e.g., if in the northern hemisphere) or south (e.g., if in the southern hemisphere) based on one or more signals received from the electronic compass 124. This becomes the initial azimuth position.

In certain embodiments, the communication circuitry 128 is configured to interface with peripheral devices 140 to align the optical system 110. The peripheral devices 140 may include, for example, a GPS receiver configured to accurately indicate the longitude and latitude of the telescope system 100 and/or a clock configured to accurately indicate the date and time. It should also be understood that a GPS receiver is able to provide timing signals which can function as precision timing reference signals. Thus, coupling a GPS receiver to the telescope system 100 provides not only coordinated timing data but also user position data from a single device. Thus, these parameters may advantageously be determined without manual entry.

In addition, or in other embodiments, the peripheral devices 140 may include, for example, an electronic focusing system, a laser configured to emit laser light in the direction of the subject being observed, an audio input and/or output device, a joystick or other controller configured to manually drive the azimuth motor 118 and the altitude motor 120, a speech recognition module along with an associated audio output module, an automatic alignment tool (tube leveler and/or axis planarizer), a photometer, an autoguider, a reticle illuminator, a cartridge reader station (e.g., for courseware, revisions, new languages, object libraries, data storage, or the like), and/or another imager or camera that is not coupled to the optical system 110 and that can be used, for example, to view terrestrial objects in the vicinity of the telescope system 100. An artisan will recognize that some or all of the peripheral devices 140 may be external accessories or may be housed with the optical system 110 and/or the electronic imager 116. An artisan will also recognize that some or all of the peripheral devices 140 may be coupled directly to the host system 130 rather than to the communication circuitry 128.

Although the host system 130 specifically and the telescope system 100 in general are disclosed with reference to their preferred and alternative embodiments, the disclosure is not limited thereby. Rather, an artisan will recognize from the disclosure herein a wide number of alternatives for host and telescope systems 130, 100, including alternative devices performing a portion of, one of, or combinations of the functions and alternative functions disclosed herein.

Figure 2:
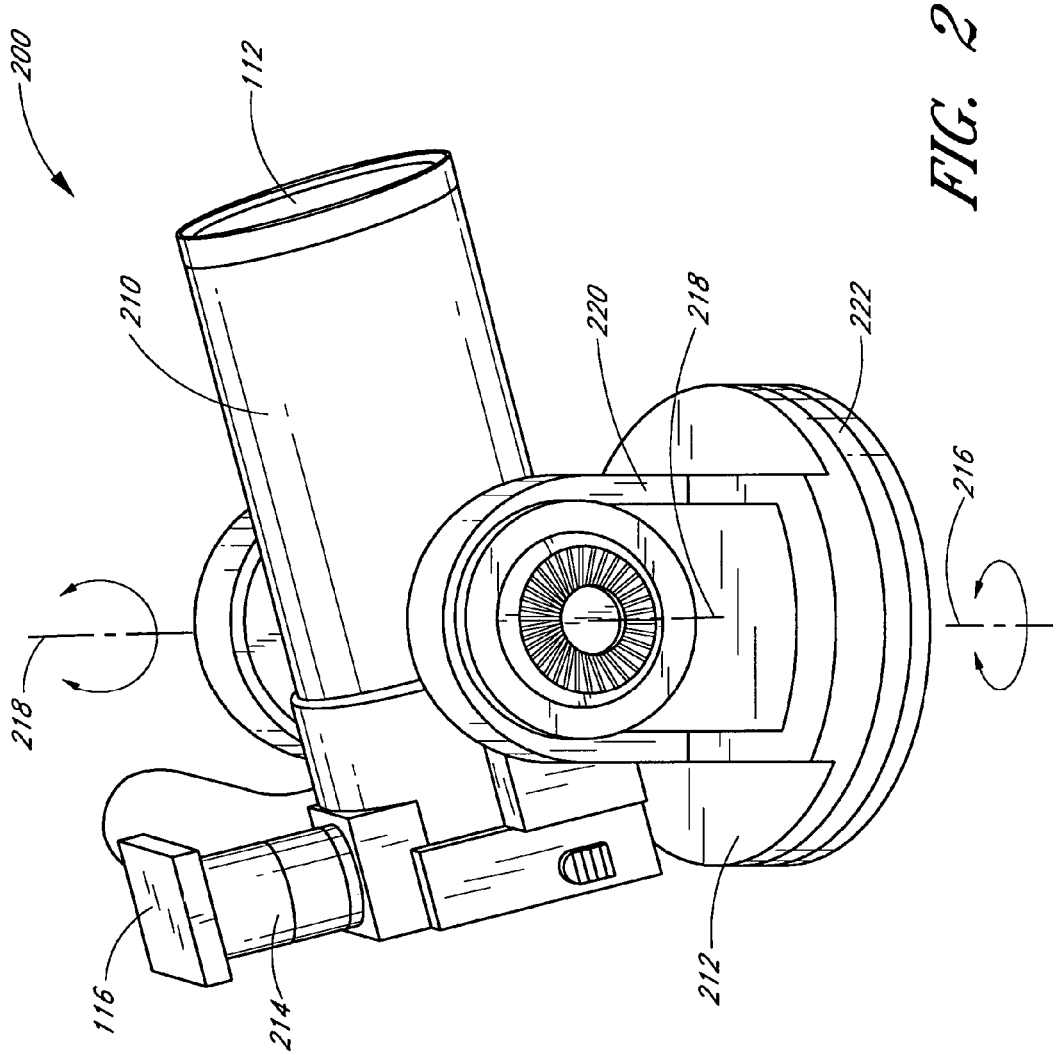
FIG. 2 is a perspective view of an exemplary telescope according to an embodiment of the disclosure usable by the telescope control system shown in FIG. 1.

FIG. 2 is a perspective view of an exemplary telescope 200 usable by the telescope system 100 shown in FIG. 1, according to an embodiment of the disclosure. The telescope 200 comprises a telescope tube 210 and a mount 212 configured to support and move the telescope tube 210. The telescope tube 210 houses an optical system that collects light from distant objects through the optical elements 112 and focuses the light onto the image plane 114 (shown in FIG. 1). In certain embodiments, the electronic imager 116 is located within the telescope tube 210 at the image plane 114. However, as shown in FIG. 2, in other embodiments, the electronic imager 116 is detachably attached to the exterior of the telescope tube 210 through a lens 214. In certain such embodiments, the lens 214 is adjustable to selectively provide additional optical magnification or reduction of the image provided at the image plane 114. Thus, a user or the host system 130 can change the field of view as desired.

As discussed above, in certain embodiments the electronic imager 116 comprises, for example, a CMOS image array, a CCD camera, or the like. Such imaging devices are generally more sensitive to light than the human eye. Thus, as shown in FIG. 2, in certain embodiments the telescope 200 does not include an eyepiece and images of celestial objects are viewed on a display screen (not shown). Since there is no eyepiece, the telescope 200 may not be positioned at a convenient viewing height for a user. Thus, the telescope 200 can advantageously be used without a conventional tripod and can simply be placed on the ground or another stable object, further reducing the cost and complexity of operating the telescope 200 as compared to conventional telescope systems. However, in other embodiments, the optical system 110 splits the light such that it can be viewed both through an eyepiece (not shown) and on a display screen.

Although not shown in FIG. 2, the electronic imager 116 may include a display screen for viewing images. In addition, or in other embodiments, the telescope tube 210 or mount 212 may include a display screen for viewing images generated by the electronic imager 116. Such display screens may comprise, for example, a liquid crystal display (LCD) or similar device, such as those associated with digital cameras, camcorders, laptops, cell phones, personal digital assistants (PDAs), other computing devices, or the like.

The telescope tube 210 is supported by the mount 212 which facilitates movement of the telescope tube 110 about two orthogonal axes, an azimuth axis 216 and an altitude axis 218. The axes 216, 218 of the mount 212, in combination, define a gimbaled support for the telescope tube 210 enabling it to pivot about the azimuth axis 216 in a horizontal plane and, independently, to pivot about the altitude axis 218 through a vertical plane. In certain embodiments, a user may not level the mount 212 with respect to the earth. For example, the mount 212 may be tilted forward or backward with respect to the direction of the telescope tube 210. The mount may also be tipped in a perpendicular direction to the telescope tube 210. In certain embodiments, one or more signals from the level sensor 122 (shown in FIG. 1) are used to measure the tip and tilt of the mount 212 with respect to a level position.

It should be noted that the telescope tube 210 is configured as a reflecting-type telescope, particularly a Maksutov-Cassegrain telescope. In this regard, the form of the telescope's optical system is not particularly relevant to practice of principles of the present disclosure. Thus, even though depicted as a reflector, the telescope 100 of the present disclosure is suitable for use with refractor-type telescope optical systems. The specific optical systems used might be Newtonian, Schmidt-Cassegrain, Maksutov-Cassegrain, or any other conventional reflecting or refracting optical system configured for telescopic use. For example, the telescope 100 may comprise a dome telescope such as are generally operated by professional astronomers.

Although not shown in FIG. 2, the telescope 200 includes the azimuth motor 118 and the altitude motor 120 discussed above. The azimuth motor 118 and the altitude motor 120 are respectively coupled to the azimuth axis 216 and altitude axis 218 so as to pivotally move the telescope tube 210 about the corresponding axis. In certain embodiments, the altitude motor 120 is disposed within a vertically positioned fork arm 220 of the mount 212 and the azimuth motor 118 is disposed within a horizontally positioned base 222 of the mount 212. Motor wiring is accommodated internal to the structure of the mount 212 (including the fork arm 220 and the base 222) and the system's electronic components are packaged accordingly.

Although the exemplary telescope 200 is disclosed with reference to its preferred and alternative embodiments, the disclosure is not limited thereby. Rather, an artisan will recognize from the disclosure herein a wide number of alternatives for the telescope, including optical viewing devices including academic or governmental installations to personal magnification devices, dome-mounted devices, all manner of telescope devices, or the like.

Figure 3:
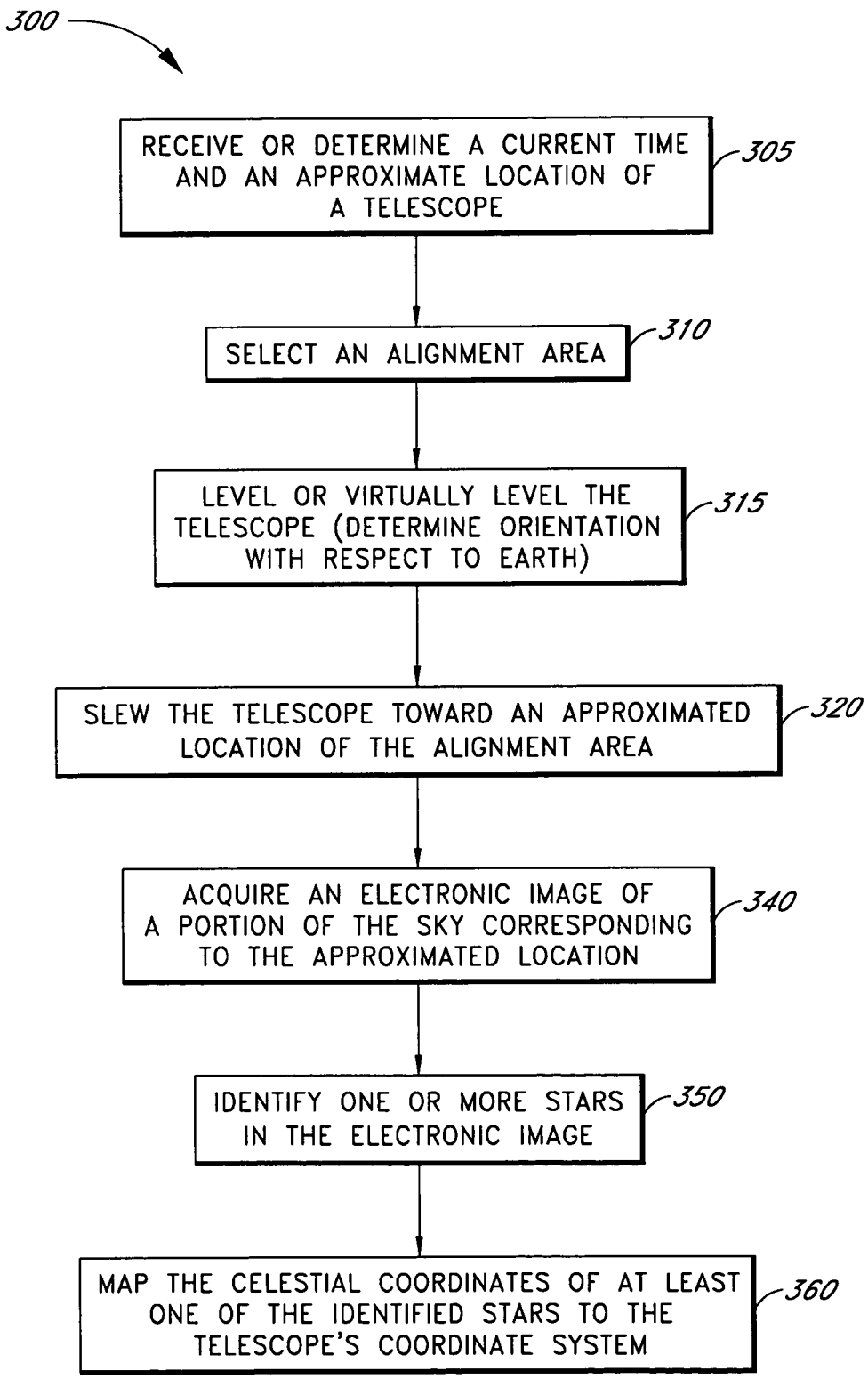
FIG. 3 illustrates an exemplary self-alignment process according to an embodiment of the disclosure.

FIG. 3 illustrates an exemplary self-alignment process 300 according to an embodiment of the disclosure. The process 300 is usable by a telescope system, such as the telescope system 100 of FIG. 1. The alignment process 300 comprises, in short, receiving or determining a current time and an approximate location of a telescope, selecting an alignment area, leveling or virtually leveling the telescope (determining the orientation of the telescope with respect to earth), slewing the telescope toward an approximated location of the alignment area, acquiring an electronic image of a portion of the sky corresponding to the approximated location, identifying a center of a current field of view, and mapping the celestial coordinates of the center of a current field of view to the telescope's coordinate system. An artisan will recognize from the disclosure herein a wide variety of alternate mapping procedures, including for example, identifying a particular alignment star and using it to create the appropriate mapping, identifying a particular pattern of stars and using that information to create the appropriate mapping, identifying a sidereal drift and using that information to create the appropriate mapping, or the like.

In certain embodiments, the self-alignment process 300 moves the telescope or adjusts any of its optical components. For example, a user may advantageously place a telescope, such as the telescope 200 of FIG. 2, on the ground or another stable object and connect it to a laptop or other computing device. The user may then be provided with a graphical user interface on a display screen of the laptop, for example, that allows the user to select a celestial object from a list of celestial objects that may be viewable from the user's location at a particular date and time. The date, time and location of the user may be entered into the laptop, for example, by the user or automatically provided by a GPS receiver connected to the laptop. Once the user selects a desired celestial object from the list, the alignment process 300 automatically aligns the telescope tube 210 with the desired celestial object without further action from the user. An image of the desired celestial object may then be displayed, for example, on the display screen of the laptop.

Referring to FIG. 3 at block 305, the self-alignment 300 includes receiving or determining a current time and an approximate location of a telescope. The current time includes, for example, the current date. As discussed above, in certain embodiments, this information is provided by a GPS receiver. In other embodiments, the current time and/or approximate location of the telescope may be received directly from a user, other peripheral devices, or the like. At block 310, the process 300 includes selecting an alignment area used to orient a telescope with the celestial coordinate system. In certain embodiments, the alignment area is selected from viewable portions of the sky based on the current time and the approximate location of the telescope with respect to the earth. In addition, or in other embodiments, the alignment area is selected based at least in part on a celestial object selected by a user for viewing. For example, the alignment area may be selected because it is near the celestial object selected for imaging by the user. In other embodiments, the telescope is simply slewed toward the sky to a location above an approximation of potential horizon interference (such as, for example, above approximately 30° over the horizon) and sufficiently below an approximate vertical to generate accurate alignment data (such as, for example, below 75° over the horizon).

In certain embodiments, the selected alignment area includes stars with known celestial coordinates and relationships. For example, an alignment area may include an alignment star and one or more additional stars in the vicinity of the alignment star that help identify the alignment star. For example, in certain embodiments, the alignment star is associated with one or more other stars that form a recognizable pattern. Data related to such patterns may be stored and used to later recognize the patterns. The data may include, for example, differences in magnitude or brightness between a group of stars in the alignment area, angular distances between the group of stars, a shape formed by the group of stars, angles formed between the stars in the group, combinations of the foregoing, and the like.

At block 315, the self-alignment process 300 includes leveling or virtually leveling the telescope. In certain embodiments, the telescope is in an unknown orientation with respect to the earth. For example, as discussed above, a user may set the telescope on the ground or on a tripod without precision leveling the telescope. Thus, the telescope may be tilted in a first direction and tipped in a second direction such that the rotation axes of the telescope form angles with the horizon. The user may also set the telescope on the ground or on the tripod without pointing the telescope at any particular object (e.g., the north star or another know celestial object) or in a known direction (e.g., with respect to the north pole or the south pole). As discussed in greater detail below, in certain embodiments, the telescope control system is capable of determining the tip and tilt without further input from the user. The telescope control system is also capable of determining the direction in which the telescope is pointing, for example, with respect to north or south. Thus, it is possible to approximately determine the orientation of the telescope with respect to the earth.

When the level measurement, the compass direction measurements, the current time, and the location information are sufficiently accurate, then the alignment is complete and the telescope control system may advantageously slew to any set of celestial coordinates. However, in certain embodiments, such measurements and information include approximations and are not sufficiently accurate so as to allow the telescope control system to center the telescope's field of view on a selected celestial object.

Therefore, at block 320, the self-alignment process 300 includes slewing the telescope toward an approximated location of an alignment area. As mentioned in the foregoing, the alignment area may be a specific alignment star or group of stars, or may simply be a location above an approximation of potential horizon interference and sufficiently below an approximate vertical.

At block 340, the self-alignment process 300 includes acquiring an electronic image of a portion of the sky corresponding to the approximated location. The electronic image, such as a digital photograph or the like, includes image data corresponding to the alignment area including, for example, stars in the vicinity of the alignment star. At block 350, the process includes identifying one or more stars in the electronic image. An artisan will recognize from the disclosure herein that other alignment mapping could be used, such as, for example, locating the celestial position of a predetermined star or pattern of stars, an error from the predetermined star or pattern of stars, combinations of the same or the like. As discussed in detail below, in certain embodiments, the one or more stars are identified by comparing relative magnitudes among the stars and/or angular distances between the stars with known relative magnitudes and/or angular distances.

However, an artisan will recognize from the disclosure herein that other relationships between celestial objects and other pattern recognition techniques can be used to analyze the image data in order to, for example, determine the celestial coordinates of the current center of the telescope's field of view. For example, relationships between stars may include brightness, and/or color (e.g., color index, spectral class, redshift). Relationships between galaxies may include, for example, size, brightness, eccentricity of ellipse, orientation angle of ellipse, structure, and/or Hubble classification. Relationships between planetary nebulae may include, for example, color, brightness, size and/or shape. Relationships between globular star clusters may include, for example, size, brightness, star count, density as a function of radial distance, and/or color index. Relationships between planets may include, for example, size, color, diameter, brightness, and/or motion relative to adjacent stars. Relationships between minor planets and/or asteroids may include, for example, brightness, color, and/or motion relative to adjacent stars. Relationships for the earth's moon at different times include, for example, lunar phase, brightness, and/or diameter. Relationships for visible moons of the planets in the solar system include, for example, brightness and/or position relative to the parent planet and other moons. Relationships between double stars and/or multiple star asterisms include, for example, brightness, angular separation, angle of the asterism with respect to lines of right ascension/declination, angle of the asterism with respect to lines of azimuth/elevation, and/or angles of the verticies of subsets of three stars.

Once a point or the current center of the telescope's field of view has been identified, at block 360 the self-alignment process 300 includes mapping the celestial coordinates of at least one of the identified stars to the telescope's coordinate system, as discussed above. Thus, the alignment is complete and the telescope can be slewed to the celestial coordinates of any desired visible celestial object.

However, in certain embodiments, it is advantageous to increase the accuracy of the alignment by identifying another group of stars in the same alignment area or in a different alignment area. For example, one iteration of blocks 310, 320, 340, 350 and 360 may provide, for example, an alignment accuracy on the order of approximately one arcminutes. However, in certain embodiments, it is desirable to have an alignment accuracy on the order of approximately one or more arcseconds.

To increase the alignment accuracy according to certain embodiments, the telescope or host system repeats at least blocks 310, 320, 340, 350 and 360 of the self-alignment process 300 shown in FIG. 3. For example, at block 310, the telescope control system selects a new alignment area. In an embodiment, the new alignment area is preferably of a longer arc length from the original alignment area. For example, long arc lengths between the previous alignment area and the new alignment area generally provide increased accuracy as compared to shorter arc lengths. While the new alignment area according to certain embodiments is closer than approximately 130° from the previous alignment area, and according to other embodiments is within the same field of view of the telescope as the previous alignment area, in certain embodiments the new alignment area is advantageously selected at an arc length of approximately 130° from the previous alignment area.

Figure 4:
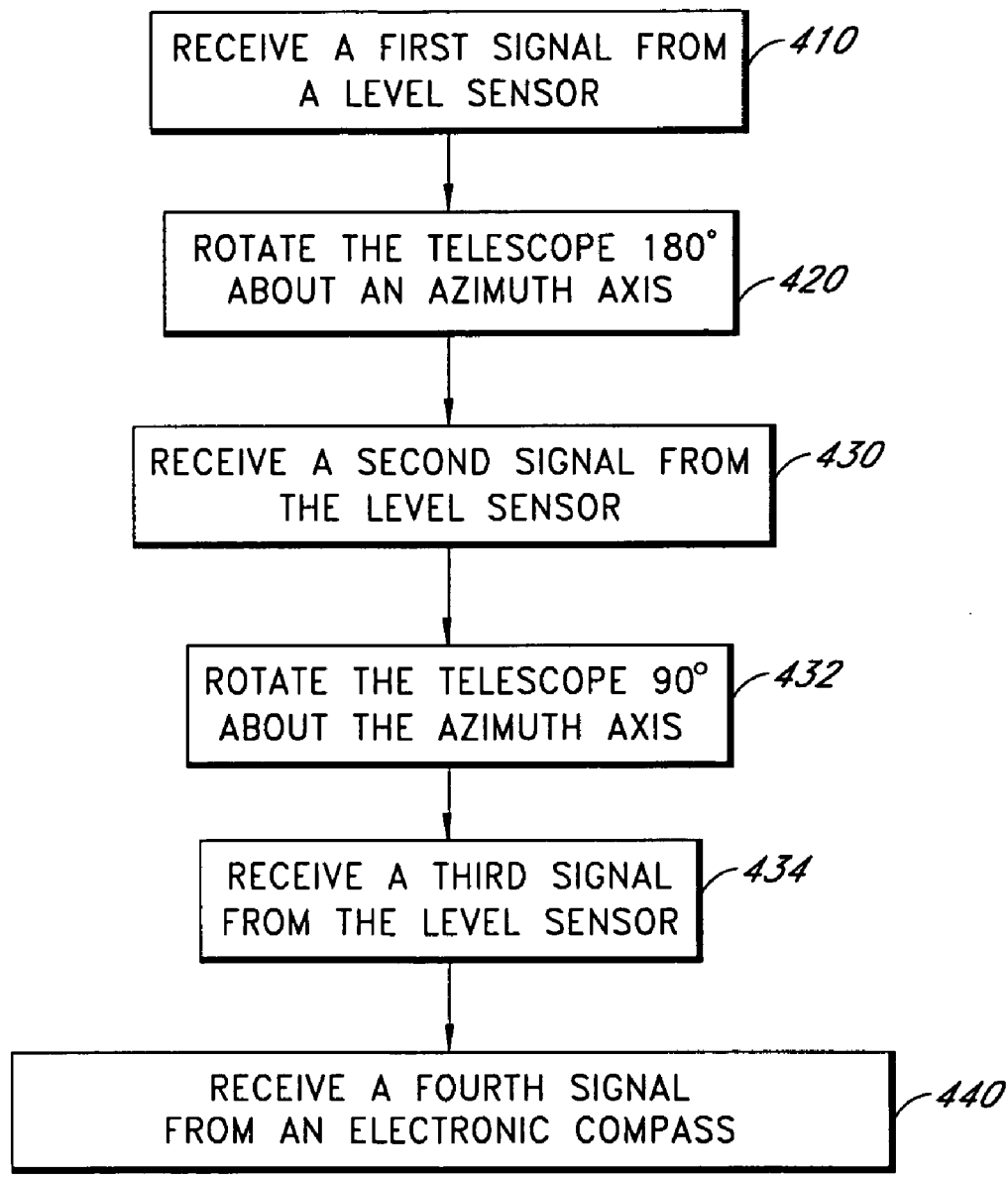
FIG. 4 illustrates an exemplary initial orientation determination process of the self-alignment process of FIG. 3, according to an embodiment of the disclosure.

FIG. 4 illustrates an exemplary initial orientation determination process 315 of the self-alignment process 300 of FIG. 3, according to an embodiment of the disclosure. The initial orientation determination process 315 measures the difference between the direction that the telescope is pointing relative to the horizon in one plane and a compass direction in another plane. At block 410, the process 315 includes receiving a first signal from a level sensor. The level sensor is positioned with respect to the telescope such that it indicates when the telescope is approximately level with the horizon. In certain embodiments, additional measurements increase accuracy. In such embodiments, at block 420, the process 315 includes rotating the telescope about 180° about an azimuth axis. At block 430, the process 315 includes receiving a second signal from the level sensor. By taking level measurements about 180° apart, errors in the direction above the horizon cancel, at least partially, with errors in the direction below the horizon. Thus, an accurate measurement of tilt, as discussed above, can be acquired. At block 432, in certain embodiments, the process 315 includes rotating the telescope about 90° about the azimuth axis. At block 434, the process 315 includes receiving a third signal from the level sensor. By taking a level measurement about 90° from the other level measurements, an accurate measurement of the tip, as discussed above, can be acquired. Thus, the virtual location of the telescope with respect to the earth is determined.

Figure 5:
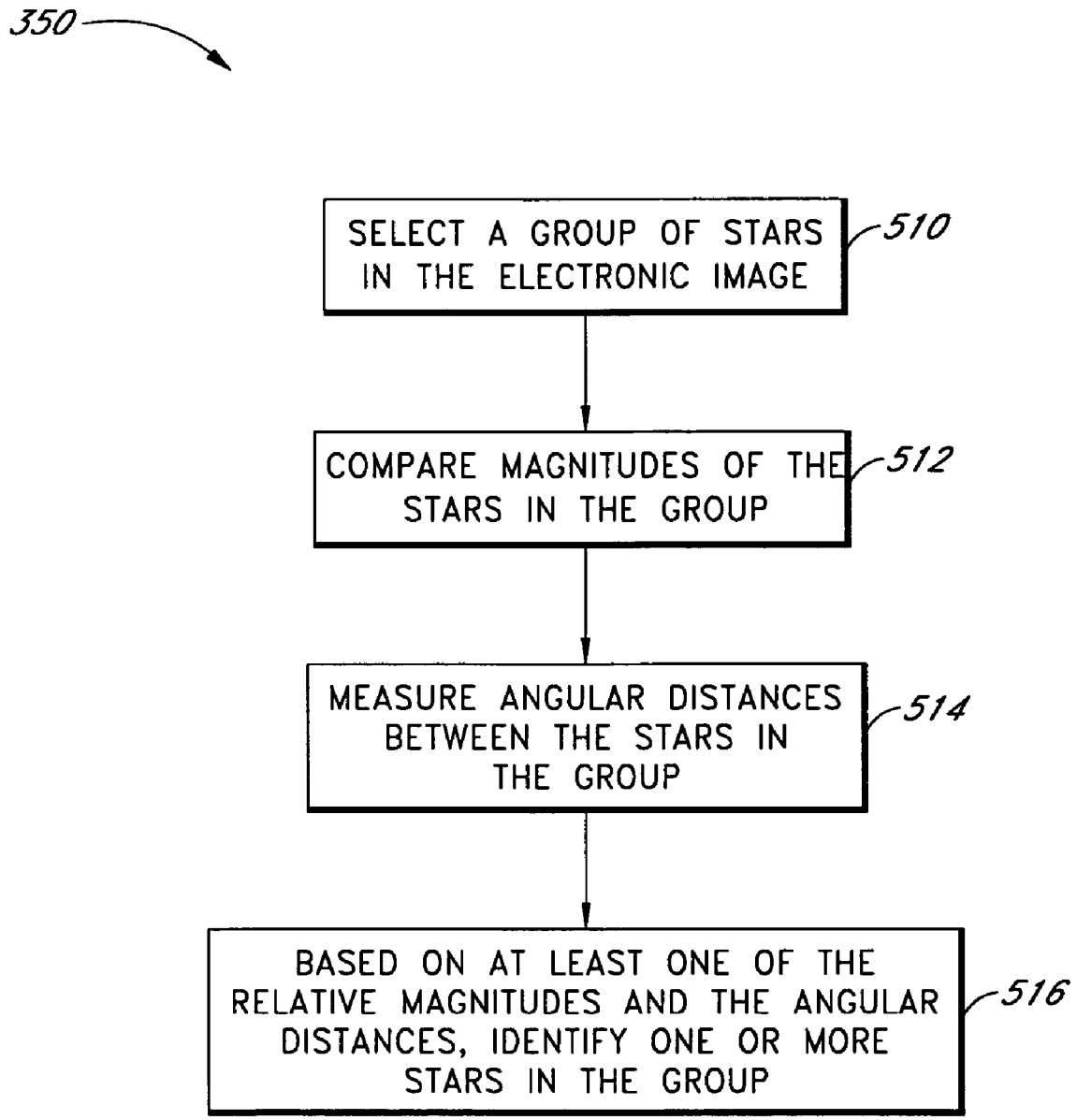
FIG. 5 illustrates an exemplary field of view identification process of the self-alignment process of FIG. 3, according to an embodiment of the disclosure.
Figure 6:
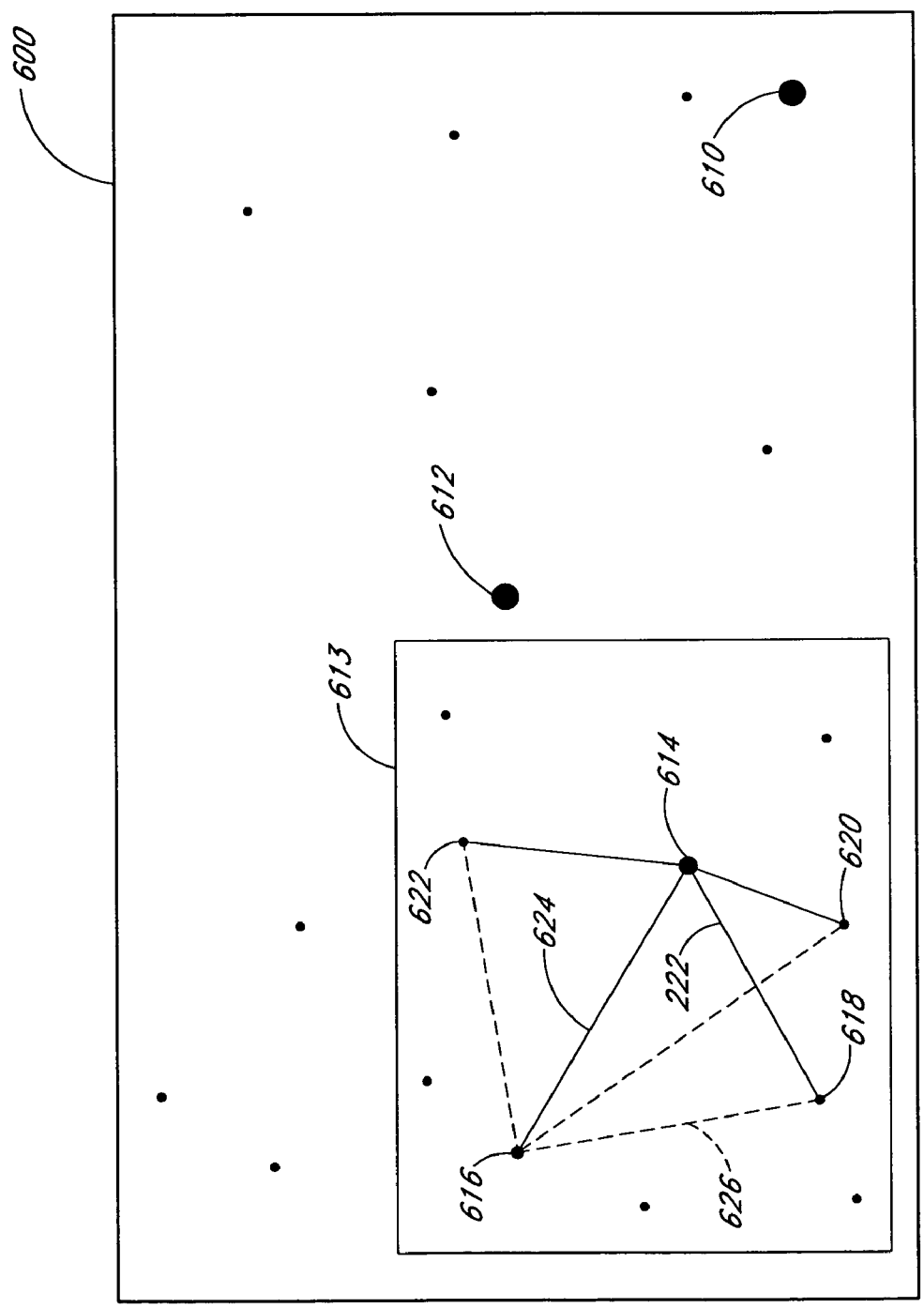
FIG. 6 is an exemplary graphical representation of an alignment area used in the field of view identification process of FIG. 5, according to an embodiment of the disclosure.

At block 440, the process 315 includes receiving a fourth signal from an electronic compass. As discussed above, the electronic compass is positioned with respect to the telescope such that it indicates the direction that the telescope is pointing in the azimuth plane with respect to magnetic north, for example. Once the orientation of the telescope with respect to the earth (e.g., its tip, tilt and direction with respect to magnetic north) has been measured, the telescope can be rotated in azimuth and/or elevation to point at a selected position (at least approximately) in the celestial coordinate system FIG. 5 illustrates an exemplary field of view identification 350 process of the self-alignment process 300 of FIG. 3, according to an embodiment of the disclosure. Moreover, FIG. 6 is an exemplary graphical representation of an alignment area used in the field of view identification process of FIG. 5. Referring generally to FIGS. 5 and 6, the process 350 includes selecting a group of stars in the electronic image at block 510. In certain embodiments, a predetermined number of bright stars or stars having the greatest magnitude relative to other stars in the electronic image are selected. In certain embodiments, approximately two to five of the brightest stars in an electronic image are selected for pattern recognition. As shown in FIG. 6, an alignment area 600 comprises a plurality of stars including, for example, a first alignment star 610 and a second alignment star 612. For illustrative purposes, a potential exemplary field of view 613 of an electronic image is shown within the alignment area 600. In the example shown in FIG. 6, an attempt is made to slew the telescope toward the alignment area 600 such that the alignment star 612 is in the center, for example, of the field of view 613. However, due to approximations in factors such as the telescope's initial orientation with respect to the horizon and north (or south), the current time, the telescope's position or virtual position with respect to the earth, combinations of the foregoing, and the like, the alignment star is not within the field of view 613. The telescope control system can still determine its orientation by identifying one or more stars in the field of view, such as, for example, stars 614, 616, 618, 620, 622 and relating their positions in the field of view 613 to their known celestial coordinate values.

For example, at block 512, the process 350 includes comparing the magnitudes of the stars in the group (e.g., stars 614, 616, 618, 620, 622). The perceived magnitude of a given star may change over time or when acquiring images using different imaging devices. For example, factors such as atmospheric conditions, lighting conditions, combinations of the foregoing, and the like, can affect the perceived or measured magnitude of a star. Thus, it is difficult to identify stars or patterns of stars by their absolute magnitudes. However, since the electronic image acquires image data for the stars 614, 616, 618, 620, 622 at the same time, using the same imaging device, the change or difference in magnitude between each of the three stars 614, 616, 618, 620, 622 remains substantially constant and can be used for pattern recognition.

At block 514, the process according to certain embodiments includes measuring angular distances between the stars 614, 616, 618, 620, 622 in the selected group. In certain embodiments, the angular distance from a given star is measured to each star in the group that is less bright than itself. Thus, for example, the system may determine that the star 614 is the brightest star in the field of view 613 and may measure the angular distances (shown as solid lines) from the star 614 to the other stars 616, 618, 620, 622 in the group. Then, the system may determine that the star 616 is the next brightest star in the field of view 613 and may measure the angular distances (shown as dashed lines) from the star 616 to the stars 618, 620, 622. The system may repeat this process for the other stars 618, 620, 622 in the selected group. An artisan will recognize that in other embodiments the relative magnitudes of the stars 614, 616, 618, 620, 622 and/or the angular distances between the stars 614, 616, 618, 620, 622 can be measured in any order.

The plate scale of the field of view 613 is used to measure the angular distances between the stars 614, 616, 618, 620, and 622 in the selected group. The plate scale relates the size of the imager detector (generally measured in either pixels or physical units such as millimeters) to the angular dimensions of the field of view (generally measured in units such as arcseconds or arcminutes). Thus, for example, if the number of pixels (both vertically and horizontally) between the star 614 and the star 616 are known, the plate scale of the detector can be used to convert the number of pixels into an angular distance that can be compared to known angular distances between known stars in the alignment area 600.

In certain embodiments, the plate scale is determined before a telescope and/or imaging device is provided to a user. Thus, plate scale values can be stored in the telescope system for use during alignment procedures. In addition, or in other embodiments, a user may enter plate scale values into the telescope control system, may acquire them from the Internet or the like, for use during alignment procedures. As discussed in detail below with reference to FIG. 7, in certain embodiments, the telescope system is configured to determine plate scale values. By self-determining the plate scale data, the telescope control system of FIG. 7 can advantageously continue to perform self-alignment even when electronic imaging devices are interchanged or the plate scale is otherwise unknown or altered.

At block 516, the process 350 includes identifying one or more stars in the group based on at least one of the relative magnitudes and the angular distances. For example, in certain embodiments, the telescope system searches portions of a database corresponding to the selected alignment area for a set of stars having magnitudes relative to one another that match or are similar to the measured relative magnitudes of the group of stars in the electronic image. Once a match is found, the stored celestial coordinates relating to the match are read from the database, and the positioning of the matched star or stars within the field of view can be used to specifically identify celestial coordinates of the center of the current field of view of the telescope, thereby mapping the telescope's coordinate system to the celestial sphere.

Figure 7:
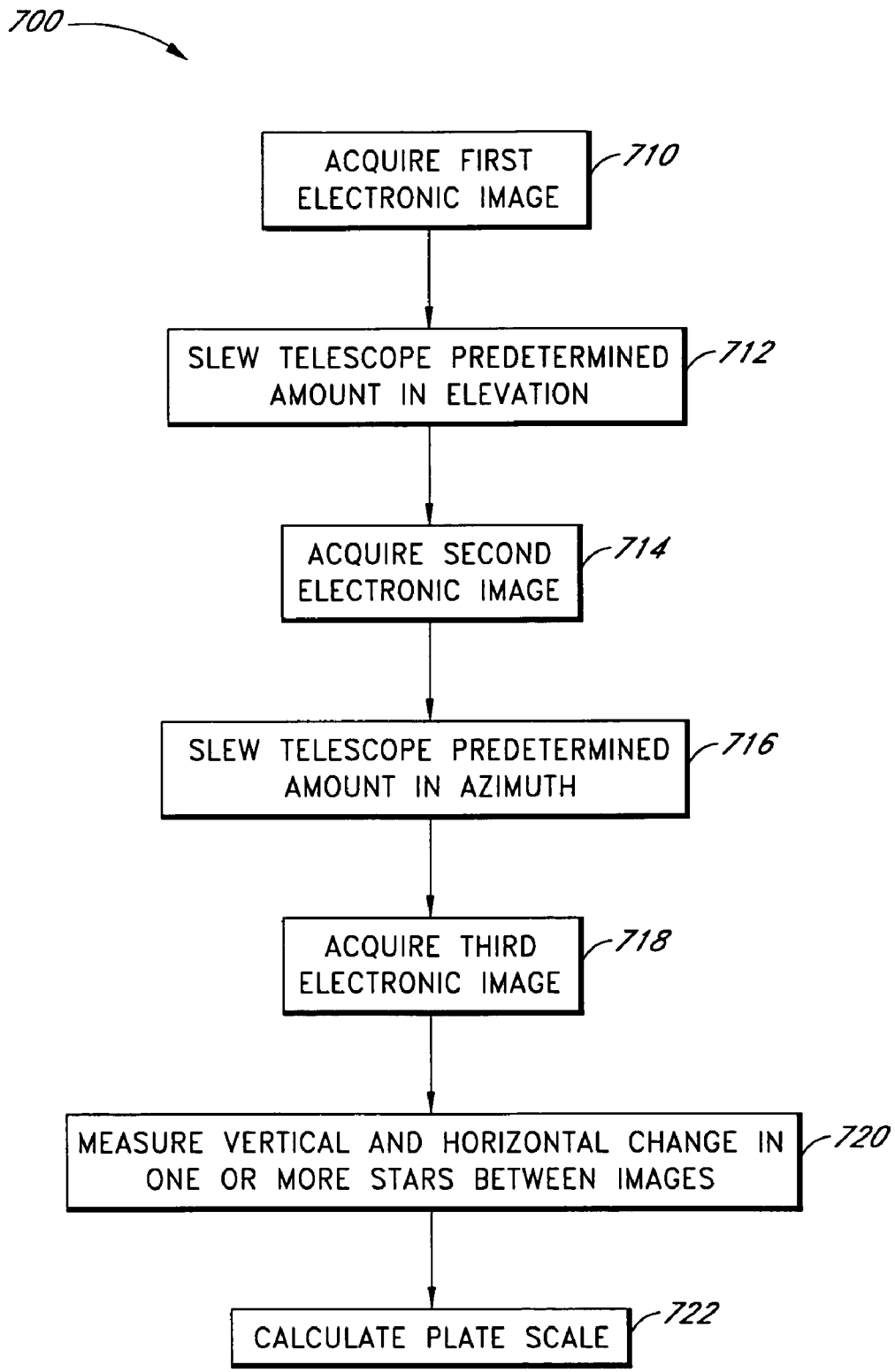
FIG. 7 illustrates an exemplary plate scale determination process according to an embodiment of the disclosure.

FIG. 7 illustrates an exemplary plate scale determination process 700 according to an embodiment of the disclosure. At block 710, the process 700 includes acquiring a first electronic image. At block 712, the process 700 comprises slewing a telescope a predetermined amount in elevation. At block 714, the process 700 includes acquiring a second electronic image. At block 716, the process 700 includes slewing the telescope a predetermined amount in azimuth. At block 716, the process 700 includes acquiring a third electronic image.

At block 720, the process 700 includes measuring vertical and horizontal changes in one or more stars between the images. Thus, for a given change in elevation, a star in the first image will change a measurable number of pixels in the vertical direction between the first electronic image and the second electronic image. Also, for a given change in azimuth, the star in the second image will change a measurable number of pixels in the horizontal direction. At block 722, the process 700 includes calculating the plate scale based on the observed change in the position of the one or more stars between the images. Thus, the number of arcseconds per pixel in either direction can be measured and used to determine, for example, the angular distances between the stars 614, 616, 618, 620, 622 shown in FIG. 6.

After measuring the plate scale, the first, second or third electronic image can then be used, for example, to recognize the pattern of stars 614, 616, 618, 620, 622 in the field of view 613 and map their celestial coordinates with the coordinate system of the telescope, as described herein. For example, in certain embodiments, a telescope system acquires a first image in an alignment area, adjusts the azimuth and elevation of the telescope predetermined amounts, acquires a second image in the alignment area, calculates the plate scale, and uses the second image to identify one or more stars. An artisan will also recognize from the disclosure herein that fewer or more electronic images can be acquired. For example, in certain embodiments, a telescope system may acquire only two images that are displaced from one another in both elevation and azimuth.

While certain embodiments for aligning telescopes have been described above, other embodiments within the scope of the disclosure will occur to those skilled in the art. For example, in certain embodiments, telescope alignment can be achieved by measuring the drift of one or more stars as taught in U.S. patent application Ser. No. 09/771,385, filed Jan. 26, 2001, by Baun et al., which is hereby incorporated herein in its entirety.

Figure 8:
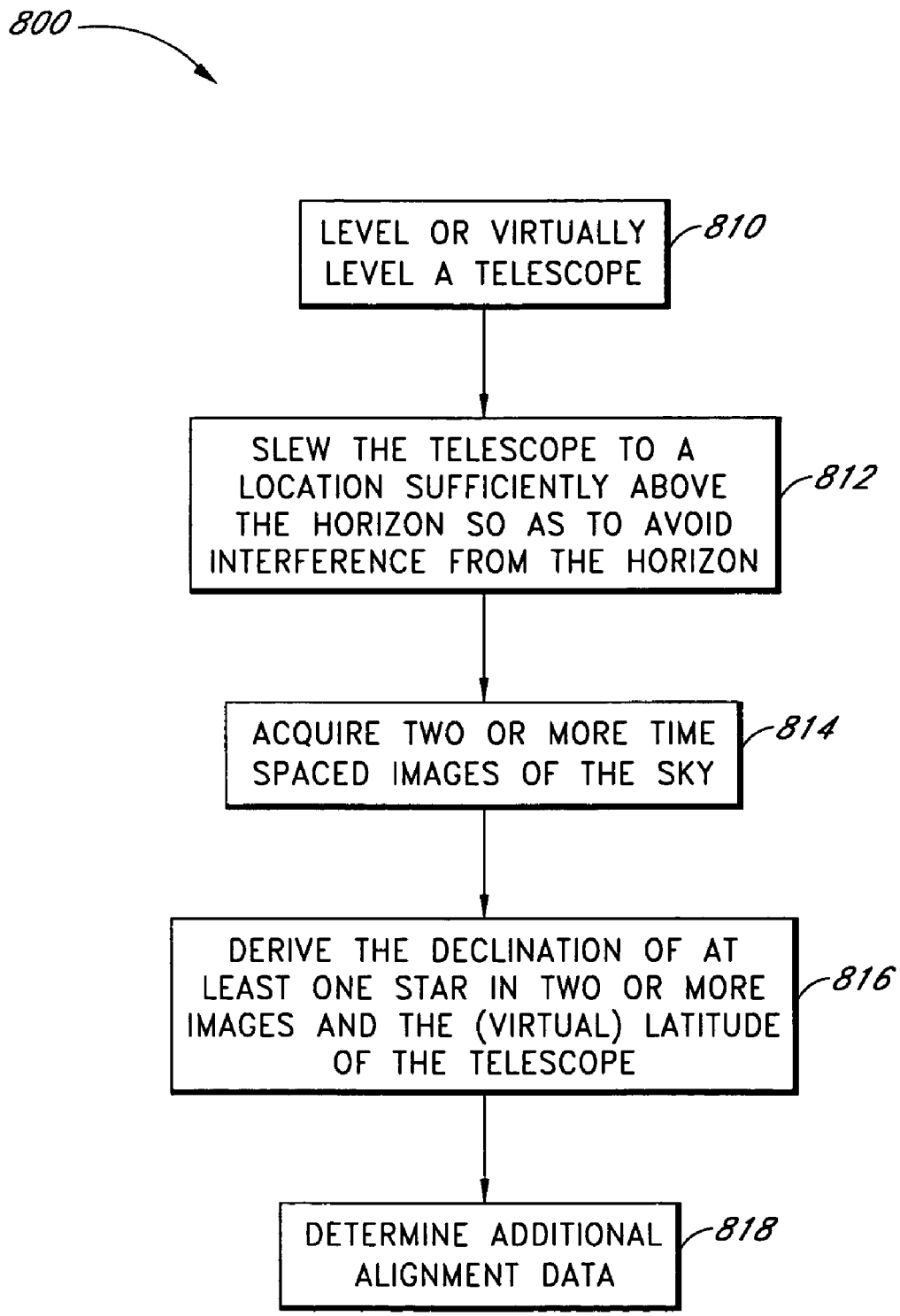
FIG. 8 illustrates an exemplary self-alignment process according to another embodiment of the disclosure.

For example, FIG. 8 illustrates an exemplary self-alignment 800 process according to another embodiment of the disclosure. At block 810, the process 800 includes leveling or virtually leveling a telescope. The telescope may be virtually aligned with the horizon using, for example, the process 315 discussed above in relation to FIG. 4. At block 812, once the orientation of the telescope with respect to the horizon has been measured, the process 800 includes slewing the telescope to a location sufficiently above the horizon so as to avoid atmospheric interference near the horizon. Atmospheric interference may include, for example, pollution or light interference from nearby cities or towns. In certain embodiments, the telescope is slewed in a range between approximately 30° and approximately 75° above the horizon.

At block 814, the process 800 includes acquiring two or more time-spaced images of the sky. As time passes, the stars have an apparent path that arcs across the sky due to the rotation of the earth. At block 816, the process 800 includes deriving the declination of at least one star (e.g., the celestial coordinates of the at least one star are previously unknown) in the two or more images and the (virtual) latitude of the telescope. The two or more images are compared to determine the arc or apparent path of at least one star. The declination of the star is related to the radius of the star's arc across the sky. Since the declination corresponds to latitude projected on the sky, the telescope's (virtual) latitude can be derived from the declination measurement without knowing before hand the celestial coordinates of the star.

At block 818, the process 800 includes determining additional alignment data. For example, in certain embodiments, the telescope system identifies a star in at least one of the time-spaced images and maps the known celestial coordinates of the identified star to the telescope's coordinate system. In certain such embodiments, the telescope system uses the exemplary process 350 discussed above in relation to FIG. 5 to identify one or more stars in at least one of the images. However, rather than searching portions of a database corresponding to an alignment area, the telescope system searches portions of the database corresponding to the declination derived at block 816.

As another example, in certain embodiments, the (virtual) latitude of the telescope is used to determine how far to adjust the telescope's elevation such that the telescope can be slewed to the celestial pole. The declination of the telescope is then increased along a line of constant right ascension the calculated distance. Once pointing at the celestial pole, the telescope system estimates the local sidereal time by measuring a rotation angle with respect to zero-hour sidereal time of a predetermined pattern of stars near the celestial pole. In certain such embodiments, the telescope system then uses the exemplary process 350 discussed above in relation to FIG. 5 to identify one or more stars in at least one of the images used to derive the declination. However, rather than searching portions of a database corresponding to an alignment area, the telescope system searches portions of the database corresponding to the estimated local sidereal time.

Although the self-alignment process 300 is disclosed with reference to its preferred and alternative embodiments, including sub-embodiments of FIGS. 4-6, the disclosure is not intended to be limited thereby. Rather, a skilled artisan will recognize from the disclosure herein a wide number of alternatives. For example, a telescope system according to certain embodiments of the invention can be aligned by tracking a known object using an imaging device. With little or no prior information on the telescope's location with respect to the earth or position relative to a mount, the telescope can be slewed by a user to a known object. Alternatively, the user may identify to the telescope system an object in the field of view.

Using an imager to measure relative changes in azimuth and elevation with time, the telescope commences to command motors as necessary to track the object. Over a period of time, changes in azimuth and elevation (e.g., delta Az (dAz/dt) and delta El (dEl/dt)) may be used along with the object's known celestial coordinates (e.g., right ascension and declination) to solve for the telescope's effective virtual latitude and local sidereal time. The telescope's effective virtual latitude and local sidereal time allow subsequent accurate pointing and tracking by the telescope of arbitrary objects. As the object is tracked for longer periods of time, the quality of the alignment improves.

In addition or in other embodiments, the telescope system is aligned by approximating the location and position of the optical system relative to a mount and measuring the drift of an object having a relatively high dAz/dt and dEl/dt. In certain such embodiments, the approximate location and position of the optical system relative to a mount is automatically determined by sensors or is entered by the user. The scope is then automatically pointed to a location in the sky where a celestial object's dAz/dt and dEl/dt are relatively high. By observing the object over time, the deviation of the observed dEl/dt and dAz/dt from the prediction based on the initial approximate alignment allows the alignment to be refined.

In other alternative embodiments, for example, a telescope system comprising an imager uses a predetermined search pattern to an alignment star or a group of alignment stars. For example, in certain embodiments a spiral search pattern is used to move a telescope in increasingly wider circles as images are acquired and analyzed to identify a group of stars, as discussed herein.

Figure 9:
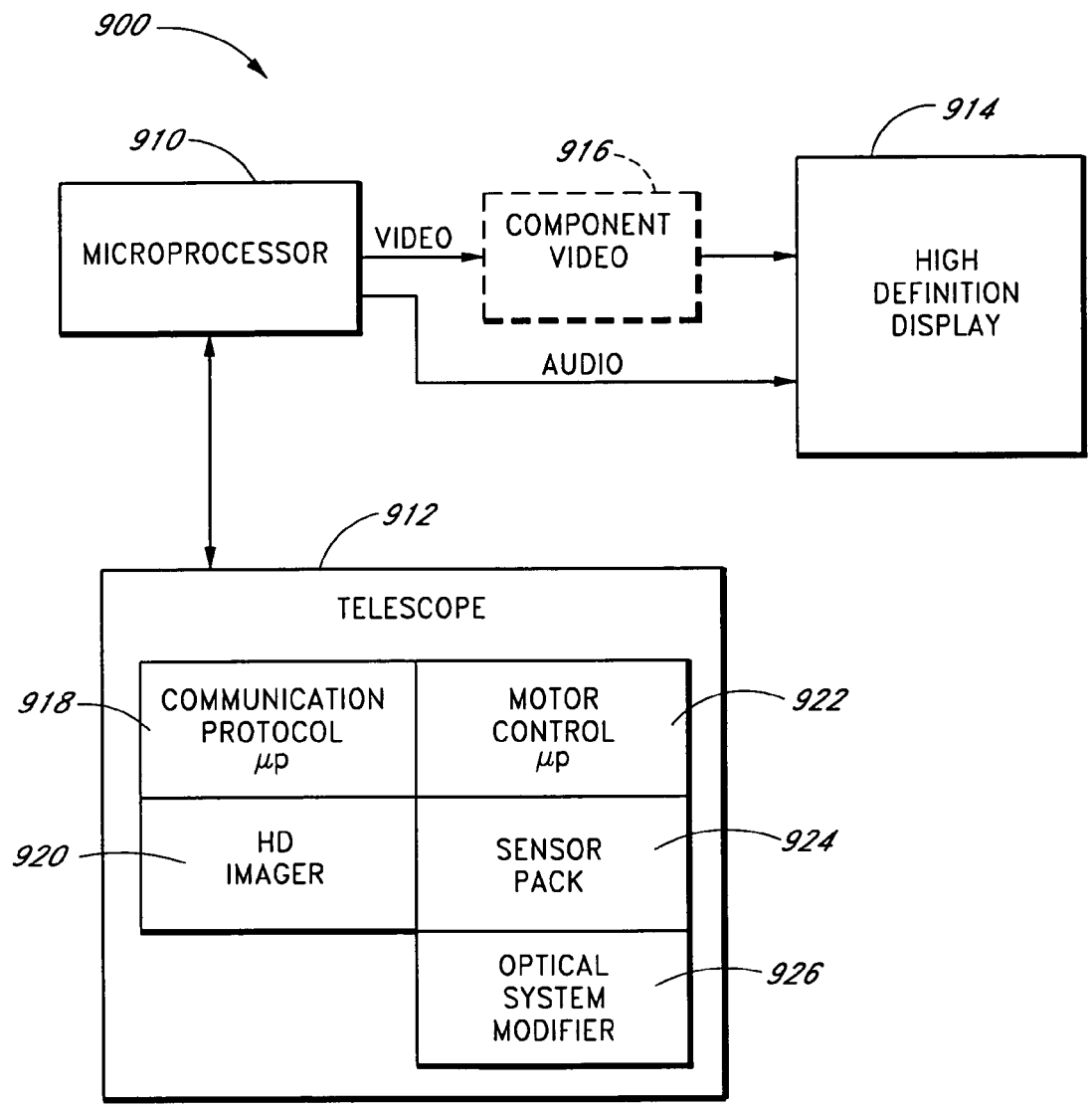
FIG. 9 is a block diagram illustrating a high definition telescope system according to an embodiment of the disclosure.

FIG. 9 is a block diagram illustrating a high definition telescope system 900 according to an embodiment of the disclosure. The system 900 includes a microprocessor 910, a telescope system 912, and a high definition display 914. In certain embodiments, the telescope 912 comprises the telescope system 100 shown in FIG. 1. The microprocessor 910 comprises, by way of example, program logic or substrate configurations representing data and instructions, which operate as described herein. In other embodiments, the microprocessor 910 can comprise controller circuitry, processor circuitry, processors, general purpose single-chip or multi-chip microprocessors, digital signal processors, embedded microprocessors, microcontrollers, and the like. In certain embodiments, the microprocessor 910 comprises a desktop or laptop computer configured to automatically align the telescope 912 as described herein.

The telescope 912 includes a high definition imager 920 configured to acquire electronic images of the celestial objects. The microprocessor 910 may process the electronic images from the high definition imager 920 for pattern recognition and alignment as discussed herein. The microprocessor 910 may also format the electronic images and provide video data and audio data to the high definition display 914. In certain embodiments, the video data is provided to the high definition display 914 through component video inputs 916.

Exemplary resolutions for the high definition display 914 include, for example, 1920×1080 (interlaced), 1280×720 (progressive scan) and 1920×1080 (progressive scan). However, an artisan will recognize from the disclosure herein that other resolutions can also be used, including higher resolutions or lower resolutions such as those associated with televisions not generally considered high definition. As discussed above, in certain embodiments imaging devices are generally more sensitive to light than the human eye, thus comparatively low resolution devices can increase the definition and quality of the electronic images displayed on the high definition display 914.

The telescope 912 also includes a communication protocol microprocessor 918, a motor control microprocessor 922, a sensor pack 924, and an optical system modifier 926. The communication protocol microprocessor 918 is configured to handle data communication between the telescope 912 and the microprocessor 910 through, for example, an Ethernet connection. In certain embodiments, the communication microprocessor 918 is configured to handle data over a wireless network connection, as is known in the art. In certain embodiments, the communication protocol microprocessor 918 uses a standard protocol such as TCP/IP or the like. The high definition imager 920 is configured to generate electronic images of subjects. In certain embodiments, the high definition imager 920 comprises, for example, a charge coupled device (CCD) camera, a complimentary metal oxide semiconductor (CMOS) image array, or the like.

The motor control microprocessor 922 is configured to slew the telescope in azimuth and elevation as described herein. The sensor pack 924 may include, for example, a GPS receiver configured to accurately indicate the longitude and latitude of the telescope system 100, a clock configured to accurately indicate the date and/or time (e.g., an atomic time standard), a level sensor, an electronic compass, environmental sensors (e.g., a moisture sensor, a dew sensor, a rain sensor, a cloud sensor, a temperature sensor, etc.), an additional "all sky" imager with a field of view in excess of 90 degrees, security sensors, proximity sensors, motion sensors, power supply low voltage sensors, stow or locked sensors, motion limit sensors, combinations of the foregoing, and the like. In certain embodiments, the sensor pack 924 is configured to activate a protection system. For example, the sensor pack 924 may provide information used to automatically cover or close the telescope 912 during adverse weather conditions. As another example, the sensor pack 924 may provide information used to activate a dew heater to heat leading elements in the optical system to prevent or reduce condensation on the optics.

The optical system modifier 926 is configured to interchange relay optics in the optical system of the telescope 912 to adjust characteristics such as focal length, bandpass response, aperture ratio, combinations of the foregoing, and the like. In certain embodiments, the optical system modifier 926 is configured to interchange optical components such as filters (e.g., solar, red, green, blue, or selected spectral emission lines), lenses and the like. In certain embodiments, the system 900 automatically selects the optical elements used by the optical system modifier 912. In addition, or in other embodiments, a user can select the optical elements used by the optical system modifier 926 and/or can override the optical elements selected by the system 900.

The system 900 enhances the experience of observing celestial objects by allowing a user to quickly and easily select celestial objects from a list, allowing a system to automatically determined celestial objects to view, or allowing a user to simply enter celestial coordinates and view the celestial objects on the high definition display 914. For example, the microprocessor 910 may provided the user with a list of recommended celestial objects or events to view on a particular night at a particular geographical location. The objects or events may include, for example, planets, satellites, moons, stars, the sun, meteors, comets, constellations, galaxies, star systems, man-made satellites, or any other celestial object or event. In certain embodiments, the user selects a celestial event or object from the list and the microprocessor 910 aligns the telescope with the selected celestial event or object as described herein. The microprocessor 910 may determine what field of view to use for the selected celestial object and which portions of the selected object or event to display. The microprocessor 910 may overlay text on the images to identify certain features. The microprocessor 910 may also select and/or control other imaging parameters such as focusing, filtering, zoom, diffraction, selection of a portion of a spectrum (e.g., when used with spectroheliography), combinations of the foregoing, and the like. The microprocessor 912 can then acquire images of the selected celestial objects and display the images on the high definition display 914.

In certain embodiments, the microprocessor 914 creates a mosaic of several images having relatively small fields of view to create an image having a larger field of view. In addition, or in other embodiments, the microprocessor 914 combines images having varying fields of view and/or different resolutions to illustrate different portions of a celestial object. For example, the microprocessor 910 may be configured to acquire a first image of Jupiter at a field of view sufficient to all or a portion of Jupiter. However, one or more of Jupiter's moons may not be visible or may not have a desired resolution when using such a field of view. Thus, the microprocessor 910 may be configured to image one or more of Jupiter's moons using other fields of view and superimpose the images of the moons with the image of Jupiter to enhance the experience of viewing Jupiter.

As another example, the microprocessor 910 may acquire a first image of Jupiter using a long exposure time to capture details of one or more of Jupiter's moons and a second image of Jupiter using a shorter exposure time to capture features of Jupiter. The microprocessor 910 can then superimpose the higher resolution images of the moons from the first image onto the lower resolution image of Jupiter from the second image. In addition, or in other embodiments, the microprocessor 914 is configured to process different portions of an image with different characteristics. For example, the microprocessor 914 may acquire a single image of Jupiter and its moons, remove Jupiter from the image, process the image so as to enhance the resolution of the moons (e.g., by increasing the contrast, brightness, etc.), and superimpose Jupiter back into the image. Other methods of enhancing the features of portions of an image will occur to those skilled in the art from the disclosure herein.

In certain embodiments, the microprocessor 910 is located at a remote location from the telescope 912. For example, the telescope 912 may be temporarily or permanently located outdoors while the microprocessor 910 may be located in a home with the high definition display 914 or in another building. In certain such embodiments, the telescope 912 may be coupled to a light source (not shown), such as a laser pointer or the like, configured to point towards user selected celestial objects. Thus, a user may advantageously view the celestial objects on the high definition display 914 and also observe the celestial objects with the naked eye, for example, as identified by the laser pointer, further enhancing the experience of observing the celestial objects.

In certain embodiments, the microprocessor 910 and/or high definition display is located in a different city, state or country than the telescope. For example, the telescope 914 may be a dome telescope or other type of telescope located remotely from the microprocessor 910 such that it is nighttime at the location of the telescope 912 when it is daytime at the location of the microprocessor 910. Thus, a user can view images during the day on the high definition display 914 of celestial events occurring at night in another part of the world. Advantageously, schools such as universities, for example, can share the use of their telescope at night with other schools in other parts of the world that desire to display celestial events during daytime classes. In certain embodiments, the telescope 912 is accessible over the Internet or other networks, including by way of example, dedicated communication lines, telephone networks, wireless data transmission systems, two-way cable systems, customized computer networks, interactive kiosk networks, automatic teller machine networks, interactive television networks, and the like.

In certain embodiments, the microprocessor 910 is configured to provide audio/visual presentations of the selected celestial objects or events. The audio may include, for example, pre-recorded or user narrations describing celestial objects being displayed on the high definition display 914. In addition, or in other embodiments, the audio may include music selected randomly, selected by a user, or selected automatically based at least in part on the particular celestial object being displayed on the high definition display 914. The audio may also include, for example, narration and background music. Thus, the experience of observing celestial objects is further enhanced. In certain other embodiments, the telescope 912 can be configured to be self-stowing and weatherproof.

While certain embodiments of the disclosures have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

What is claimed is:

1. A system for viewing celestial objects, the system comprising:
    a microprocessor;
    a terrestrial telescope comprising an imaging device, the terrestrial telescope configured to determine with minimal user intervention an approximate orientation of a telescope coordinate system with respect to a celestial coordinate system; and
    an electronic display device configured to be connected to the telescope, wherein the microprocessor is configured to identify a star pattern in an alignment electronic image acquired by the imaging device and to update the approximate orientation based at least in part on the identified star pattern, wherein the microprocessor is configured to align the telescope with a celestial object, and wherein the microprocessor is configured to provide a desired viewing electronic image of the celestial object to the electronic display device.

2. The system of claim 1, wherein the electronic display device is remotely located from the microprocessor.

3. The system of claim 1, wherein the electronic display device comprises a high definition television.

4. The system of claim 1, wherein the electronic display device is configured to be connected to a dome telescope.

5. The system of claim 1, wherein the desired viewing image comprises a mosaic of a first electronic image and a second electronic image.

6. The system of claim 5, wherein the first electronic image overlays the second electronic image.

7. The system of claim 6, wherein the first electronic image comprises a first field of view and the second electronic image comprises a second field of view.

8. The system of claim 1, wherein the microprocessor is further configured to control a light source coupled to the telescope so as to direct light toward the celestial object.

9. The system of claim 8, wherein the light source comprises a laser.

10. The system of claim 1, wherein the microprocessor is further configured to provide an audio file associated with the celestial object.

11. The system of claim 1, wherein the microprocessor is further configured to change one or more optical characteristics of the telescope.

12. The system of claim 11, wherein the one or more optical characteristics are selected from the group consisting of diffraction, optical filtering, image sizing, and spectrum selection.

13. A method for viewing a celestial object on a display device, the method comprising:
    receiving the identity of a celestial object;
    determining with minimal user intervention an approximate orientation of a coordinate system of a terrestrial telescope with respect to a celestial coordinate system;
    receiving an alignment electronic image;
    identifying one or more stars in the alignment electronic image;
    based at least in part on the identity of the one or more stars in the alignment electronic image, updating the approximate orientation of the telescope coordinate system;
    slewing the telescope to the celestial coordinates of the celestial object;
    acquiring a desired viewing electronic image of the celestial object; and
    displaying the desired viewing electronic image on a display device.

14. The method of claim 13, wherein the identity of the celestial object is received from a user controlled device.

15. The method of claim 13, wherein at least one of the alignment electronic image and the desired viewing electronic image are received from an imaging device configured to acquire images through the telescope.

16. The method of claim 15, wherein at least one of the alignment electronic image and the desired viewing electronic image are received through a network connection.

17. The method of claim 15, wherein the alignment electronic image and the desired viewing electronic image are received through a wireless network connection.

18. The method of claim 13, wherein identifying the one or more stars in the alignment electronic image comprises one or more of measuring differences in magnitude between at least two stars in the electronic image and measuring angular distances between the at least two stars in the electronic image.

19. The method of claim 13, wherein displaying the desired viewing image comprises displaying the desired viewing image in high definition.

20. The method of claim 13, further comprising:
    receiving a first image having a first field of view;
    receiving a second image having a second field of view;
    superimposing the first image and the second image to create the desired viewing image.

* * * * *